US012658552B2

(12) United States Patent
Cailleux et al.

(10) Patent No.: US 12,658,552 B2
(45) Date of Patent: Jun. 16, 2026

(54) RAT-RACE BALUN AND ASSOCIATED METHOD FOR REDUCING THE FOOTPRINT OF A RAT-RACE BALUN

(71) Applicant: THALES, Meudon (FR)

(72) Inventors: Aymeric Cailleux, Laval (FR); Laure Hogommat-Chabrot, Laval (FR)

(73) Assignee: THALES, Meudon (FR)

( * ) Notice: Subject to any disclaimer, the term of this patent is extended or adjusted under 35 U.S.C. 154(b) by 96 days.

(21) Appl. No.: 18/399,476

(22) Filed: Dec. 28, 2023

(65) Prior Publication Data

US 2024/0222839 A1 Jul. 4, 2024

(30) Foreign Application Priority Data

Dec. 29, 2022 (FR) ........................................ 2214617

(51) Int. Cl.
*H01P 5/22* (2006.01)
*H01P 5/10* (2006.01)

(52) U.S. Cl.
CPC ................ *H01P 5/222* (2013.01); *H01P 5/10* (2013.01)

(58) Field of Classification Search
CPC .................................. H01P 5/222; H01P 5/10
USPC .................................... 333/25, 26, 238, 246
See application file for complete search history.

(56) References Cited

U.S. PATENT DOCUMENTS

2018/0294537 A1* 10/2018 Borysenko .............. H01P 1/184
2022/0263212 A1 8/2022 Bianchi et al.
2022/0263251 A1 8/2022 Nabki et al.

OTHER PUBLICATIONS

Shamaileh, et al., “Compact Tunable 3 dB Hybrid and Rat-Race Couplers with Harmonics Suppression”, International Journal of Microwave and Optical Technology (IJMOT), vol. 7, No. 6, pp. 372-379, 2012.
Hirota, et al., “Reduced-size branch-line and rat-race hybrids for uniplanar MMIC’s”, IEEE Transactions on Microwave Theory and Techniques, vol. 38, No. 3, pp. 270-275, 1990.
Tian, et al., “Low-Loss Microcoaxial Rat-Race Hybrid for Si-Based Microwave Integrated Circuits”, IEEE Microwave and Wireless Components Letters, vol. 26, No. 3, pp. 162-164, 2016.
Psychogiou, et al., “Comparing miniaturization techniques for microstrip 180° hybrid ring junctions”, 2010 10th Mediterranean Microwave Symposium, pp. 29-32, 2010.

* cited by examiner

*Primary Examiner* — Jorge L Salazar, Jr.
(74) *Attorney, Agent, or Firm* — BakerHostetler

(57) ABSTRACT

A rat-race balun includes a transmission line loop and 4 input-output ports $P_1$, $P_2$, $P_3$, $P_4$ connected to the transmission line loop, the balun being designed to receive a first signal on the port $P_1$, and to divide the first signal into a second signal that is delivered to the port $P_2$ and a third signal that is delivered to the port $P_4$, the second signal and the third signal being in phase opposition with one another, the balun wherein the balun is kidney-shaped and the ports $P_2$, $P_4$ each comprise at least a first section connected to the transmission line, the first section of the port $P_2$ being parallel to the first section of the port $P_4$.

9 Claims, 6 Drawing Sheets

$Z_1$ and C chosen such that $\theta_1 < 45°$ $Z_3$ and $C_2$ chosen such that $\theta_2 < 135°$

RAT-RACE BALUN AND ASSOCIATED METHOD FOR REDUCING THE FOOTPRINT OF A RAT-RACE BALUN

CROSS-REFERENCE TO RELATED APPLICATION

This application claims priority to foreign French patent application No. FR 2214617, filed on Dec. 29, 2022, the disclosure of which is incorporated by reference in its entirety.

FIELD OF THE INVENTION

The invention lies in the field of rat-race baluns.

BACKGROUND

The term "balun" stems from the words BALanced and UNbalanced.

A balun is an electrical circuit used to link a symmetrical transmission line (two-wire line or parallel printed lines) and an asymmetrical transmission line (coaxial cable or printed line above a ground plane). A balun is for example produced using wound coaxial cable or a small section of two-wire line wound on a ferrite toroidal core or on a coreless mandrel (balun in air). Such a balun is able to operate over a wide frequency band (2 to 4 octaves). It is also possible to manufacture a balun using a loop of coaxial cable having an electrical length equal to half-wavelength. The balun is then single-frequency: in fact, it works correctly over a narrow frequency band of a few percent. Baluns are produced on printed circuits, with microstrips, striplines for example.

A rat-race balun is a loop-shaped component, conventionally in the shape of a ring or a square, comprising four ports numbered 1, 2, 3, 4 such that an incoming signal on port 1 is divided between ports 2 and 4 in phase opposition and an incoming signal on port 3 is divided between ports 2 and 4 in phase, port 3 being isolated. It therefore has the function of dividing a radiofrequency (RF) signal of power P into two RF signals of power P/2 or of combining two RF signals of power P/2 into an RF signal of power P.

A rat-race balun may also be used to combine signals: port 3 has delivered to it the difference between two signals injected at the input of the balun, after phase realignment, one at port 2, the other at port 4, and port 1 has delivered to it, after phase realignment, the sum thereof.

US 2022/0263212 describes one example of a rat-race balun.

There is a need to reduce the footprint of rat-race baluns on the electronic carriers on which they are integrated.

SUMMARY OF THE INVENTION

To this end, according to a first aspect, the present invention describes a rat-race balun, comprising a transmission line loop and 4 input-output ports $P_1$, $P_2$, $P_3$, $P_4$ connected to said transmission line loop, said balun being designed to receive a first signal on the port $P_1$, and to divide said first signal into a second signal that is delivered to the port $P_2$ and a third signal that is delivered to the port $P_4$, said second signal and said third signal being in phase opposition with one another, said balun being characterized in that:

- the balun is kidney-shaped and
- the ports $P_2$, $P_4$ each comprise at least a first section connected to the transmission line, the first section of the port $P_2$ being parallel to the first section of the port $P_4$.

Such a rat-race balun occupies a reduced footprint.

In some embodiments, such a balun will furthermore comprise at least one of the following features:

- the mutually parallel first section of the port $P_2$ and first section of the port $P_4$ face one another;
- the ports adjacent to one another from among the ports $P_1$, $P_2$, $P_3$, $P_4$ are connected by respective sections of the transmission line loop, and at least some of said sections are capacitor-loaded transmission line sections;
- each of the respective transmission line sections between $P_1$ and $P_2$, between $P_2$ and $P_3$, between $P_3$ and $P_4$ is a line section of electrical length $2\theta_1$, of impedance $Z_1$ and loaded by a capacitor of capacitance C and; where $\theta_1<45°$ and the following equalities are satisfied:

$$C = \frac{2\tan(\theta_1)}{\omega Z_c \tan(2\theta_1)}$$

$$\text{and } Z_1 = \frac{Z_c}{\tan(\theta_1)}$$

- w being equal to $2\pi f$, with f the operating frequency, and $Z_c$ being the impedance of the unloaded transmission line section of physical length $\lambda/4$ equivalent to said loaded line section;
- the respective transmission line section between the adjacent ports $P_1$ and $P_4$ is of electrical length $6\theta_1$ comprising three consecutive line subsections each of electrical length $2\theta_1$, of impedance $Z_1$ and loaded by a capacitor of capacitance C; where $\theta_1<45°$ and the following equalities are satisfied:

$$C = \frac{2\tan(\theta_1)}{\omega Z_c \tan(2\theta_1)}$$

$$\text{and } Z_1 = \frac{Z_c}{\tan(\theta_1)}$$

- w being equal to $2\pi f$, with f the operating frequency, and $Z_c$ being the impedance of the unloaded transmission line subsection of physical length $\lambda/4$ equivalent to said loaded line subsection;
- the respective transmission line section between the adjacent ports $P_1$ and $P_4$ is of electrical length $2\theta_2$, of impedance $Z_3$ and is a line section loaded by a capacitor of capacitance C2; where $\theta_2<135$ and the following equalities are satisfied:

$$C2 = -\frac{2\tan(\theta_2)}{\omega Z_{P1P4}\tan(2\theta_2)}$$

$$\text{and } Z_3 = -\frac{Z_{P1P4}}{\tan(\theta_2)}$$

- w being equal to $2\pi f$, with f the operating frequency, and $Z_{P1P4}$ being the impedance of the unloaded transmission line section of physical length $3\lambda/4$ equivalent to said loaded line section;
- the balun comprises an impedance transformer loaded by a capacitor between the port $P_1$ and the transmission line loop.

According to another aspect, the invention describes a method for reducing the footprint of a rat-race balun comprising a transmission line loop and 4 input-output ports $P_1$, $P_2$, $P_3$, $P_4$ connected to said transmission line loop, said balun being designed to receive a first signal on the port $P_1$, and to divide said first signal into a second signal that is delivered to the port $P_2$ and a third signal that is delivered to the port $P_4$, said second signal and said third signal being in phase opposition with one another, comprising the following steps implemented by an electronic device for determining rat-race balun characteristics:

determination of a kidney shape for the balun;

connection of a first section of each of the ports $P_2$, $P_4$ to the transmission line, the first section of the port $P_2$ being parallel to the first section of the port $P_4$.

In some embodiments, such a method will furthermore comprise at least one of the following features:

the mutually parallel first section of the port $P_2$ and first section of the port $P_4$ face one another;

the ports adjacent to one another from among the ports $P_1$, $P_2$, $P_3$, $P_4$ are connected by respective sections of the transmission line loop, and at least some of said sections are capacitor-loaded transmission line sections.

BRIEF DESCRIPTION OF THE DRAWINGS

The invention will be better understood and other features, details and advantages will become more clearly apparent on reading the non-limiting description that follows, and by virtue of the appended figures, which are provided by way of example.

Identical references may be used in different figures to denote identical or comparable elements.

DETAILED DESCRIPTION

Figure 1:
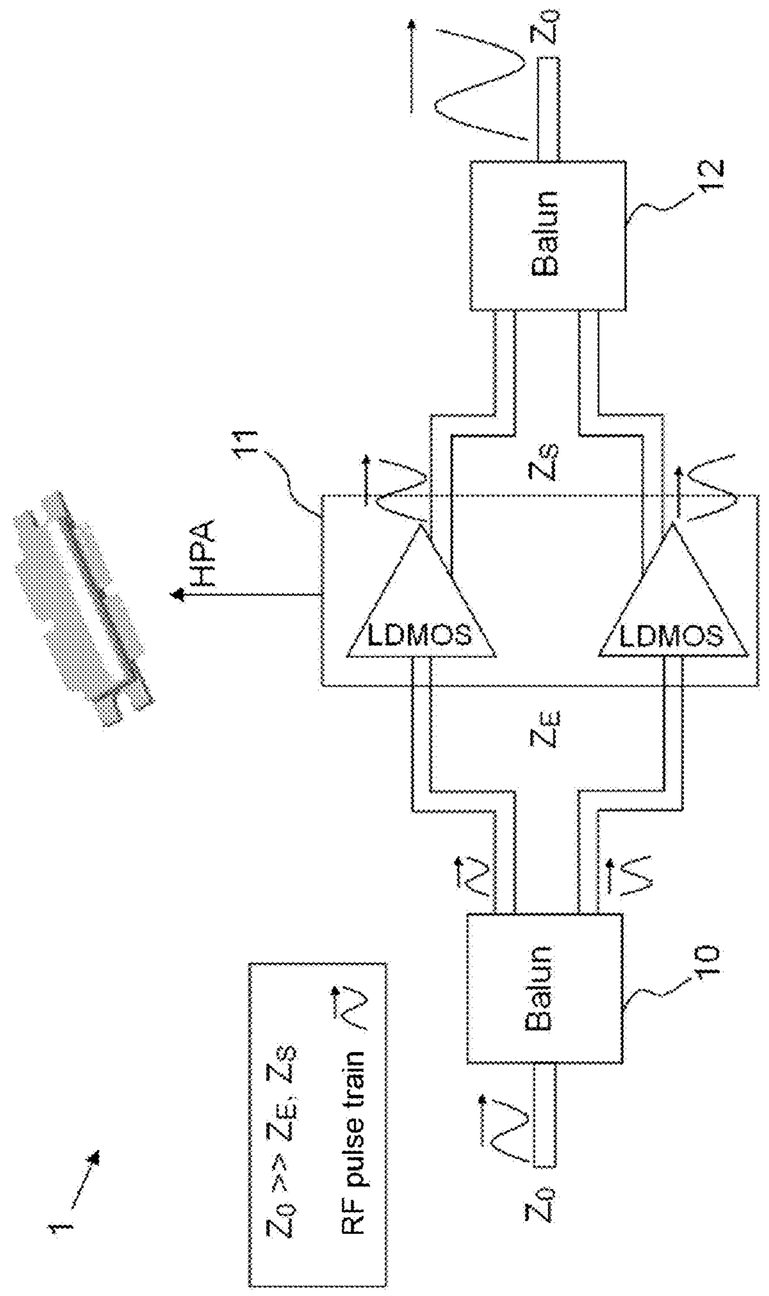
FIG. 1 schematically shows a push-pull assembly in one embodiment of the invention.

FIG. 1 schematically shows a push-pull electronic processing module 1 in one embodiment of the invention, for example operating at high frequency and integrated, on a printed circuit, into the last stage of a transmission chain of an electronic radio communication device.

The processing module 1 comprises a power transistor ("High Power Amplifier"), called HPA 11. It operates in the L band (or any other frequency band, in a narrow band, for example with a width less than 20 MHZ, or even 15 MHZ), and at powers possibly reaching 1.5 kW peak.

As is known, power transistors have a low input impedance compared to the standard impedance of 50Ω and often consist of two chips (similar to two transistors), in a push-pull assembly here, this meaning having to divide (split) the input signal and to phase-shift them from one another by 180° before supplying them to the input of the transistor. The fact that the signals supplied to the input of the HPA 11 are in phase opposition makes it possible to reduce their interference due to amplification on two very close chips.

To this end, the processing module 1 comprises, upstream of the HPA 11, a balun 10 in one embodiment of the invention.

The input signal of the processing module 1, typically a train of RF pulses in the L band (in the example under consideration with a power In 47 dBm, and a load rate of 2%), is supplied to the input of the port $P_1$ of the balun 10. The power of this input signal is P.

The two signals at the output of the ports $P_2$ and $P_4$, of the same power P/2 (to +/−0.2 dB % for example) and in phase opposition to one another, are supplied one to the input of one of the two chips of the HPA 11, and the other to the input of the other of the two chips of the HPA 11.

At the output of the HPA 11, the two amplified signals, in phase opposition, are supplied to the input of a balun 12, one on its port $P_2$ and the other on the port $P_4$. The balun 12 realigns the phases of these signals with respect to one another and outputs, on its port $P_1$, the sum of these two phase-realigned signals.

The input impedance of the balun 10 is $Z_0$, which is much greater than each of the input and output impedances $Z_E$ and $Z_S$ of the HPA 11. For example, $Z_0$=50Ω and $Z_E$, $Z_S$ less than 20 or even less than 10Ω (notably if LDMOS transistor), for example here 2.5Ω.

The balun 10, constructed here on a printed circuit board (PCB) with microstrips for example, comprises transmission line sections between each port $P_1$, $P_2$, $P_3$, $P_4$.

In a first embodiment, each transmission line section between two adjacent ports, in a conventional manner, has a physical length (in metres) \/4 outside the section between the adjacent ports $P_1$ and $P_4$ (that is to say the section that does not include the ports $P_2$, $P_3$) and that has a physical length 3λ/4, Λ being the wavelength corresponding to the centre frequency of the input signal of the processing module 1. The electrical length corresponding to the physical length λ/4 is equal to 90°. As is known, the "electrical length" is a theoretical way of expressing wavelength without having to evoke the environment of the circuit: PCB (printed circuit board). In specific terms, this consists in considering that one wavelength λ corresponds to 360°. Theoretically, for a specific application, it is necessary to keep the same wavelength ratio. The propagation of EM waves depends on the medium, and therefore changes depending on the substrate λ (in m), but its associated length does not (always 360°).

The impedance of the unloaded transmission line of physical length λ/4 is $Z_c$.

In a second embodiment, each quarter-wave line section under consideration in the first embodiment is replaced with its equivalent as a transmission line loaded by a capacitor.

In terms of physical dimensions, these equivalent sections differ, but in terms of behaviour (if studying S parameters for example) they are identical, as shown by a narrowband observation.

Figure 2:
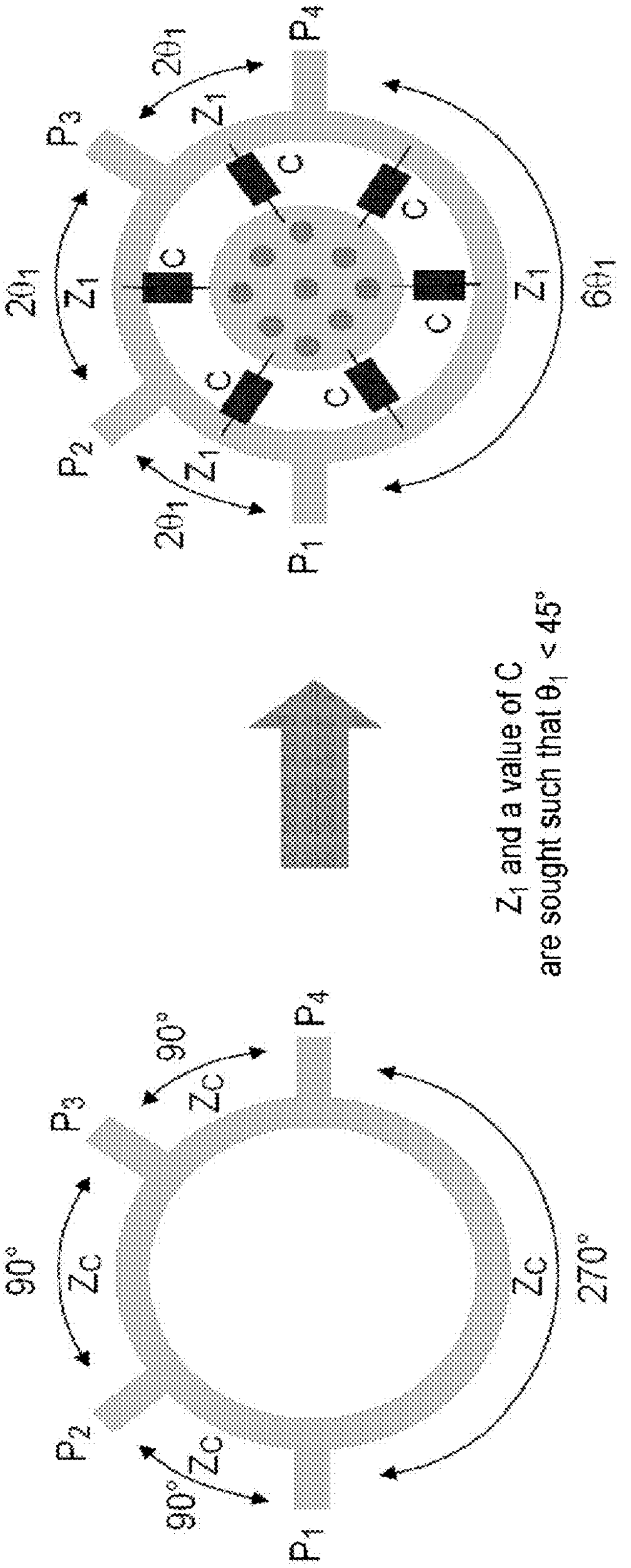
FIG. 2 illustrates the replacement, in a balun block diagram, of conventional lines with loaded lines.

This modification is detailed in "Compact Tunable 3 dB Hybrid and Rat-Race Couplers with Harmonics Suppression", Khair Al Shamaileh, Mohammad Almalkawi, Vijay Devabhaktuni, and Nihad Dib, INTERNATIONAL JOURNAL OF MICROWAVE AND OPTICAL TECHNOLOGY, VOL. 7, NO. 6, NOVEMBER 2012, and is illustrated in FIG. 2 for the case of a ring-shaped balun: each transmission line section of length λ/4 (as shown on the left in FIG. 2) is thus replaced (as shown on the right in FIG. 2) with a transmission line section of electrical length $2\theta_1$, of impedance $Z_1$ and capacitor-loaded, that is to say with two transmission line segments each of electrical length $\theta_1$ and of impedance $Z_1$ interspersed with a capacitor that is connected in parallel, of capacitance C, and therefore grounded.

This then gives the following equalities:

$$Z_1 = \frac{Z_c}{\tan(\theta_1)} \quad \text{Equality 0\_1}$$

$$\text{And } C = \frac{2\tan(\theta_1)}{\omega Z_c \tan(2\theta_1)} \quad \text{equality 0\_2}$$

where w is the angular frequency, that is to say $\omega=2\pi f$, with f the operating frequency of the balun, that is to say the centre frequency of the signal.

A 52% reduction in the size of the balun, corresponding notably to the choice of a value of $\theta_1$ less than 45°, was obtained in one exemplary embodiment.

The reduction ratio depends on the chosen value of $\theta_1$, and also on the PCB (notably its dielectric permittivity parameter $\varepsilon_r$) under consideration. There is a reduction provided that $\theta_1<45°$: there is a reduction in the line length, which depends a great deal on the PCB that is used. Moreover, since $Z_1$ is inversely proportional to $\tan(\theta_1)$, tan(45°)=1 and the tan function is increasing over [0; 45° ] then the impedance of the equivalent lines is greater than that of the original line. In this case, there is a reduction in the width of the line, which depends a great deal on the PCB that is used, mainly on its thickness.

The capacitance value of the capacitor along with the impedance of the loaded line segments are deduced from the above equations linking them to the chosen electrical length $\theta_1$ less than 45°. Since the impedance is a function of the physical width of the microstrip, these are determined as a function of the impedance $Z_1$ ($Z_1$ here designating the characteristic impedance of the loaded lines, that is to say the impedance that a line would have at input if it were to be of infinite length: it does not depend on length).

It also follows that the value of the resonant frequency of the loaded transmission line may be adjusted as needed by modifying the value of C (for example by using varactor capacitors).

In Shamaileh et al., the change in impedance was an effect experienced by the authors.

It is proposed here to exploit this change in impedance: the smaller the length $\theta_1$ of the loaded sections, the higher their impedance. When using a balun 10 operating at low impedance, there is therefore more room for manoeuvre to reduce the length of the lines before reaching the limits of manufacturability associated with the line widths. It is therefore possible to obtain a component with very thin lines, of reduced length, operating at low impedances.

However, to meet one of the abovementioned specific features of the HPA, it is precisely necessary to have a balun 10 operating with low impedances at output $P_2$, $P_4$.

Figure 3:
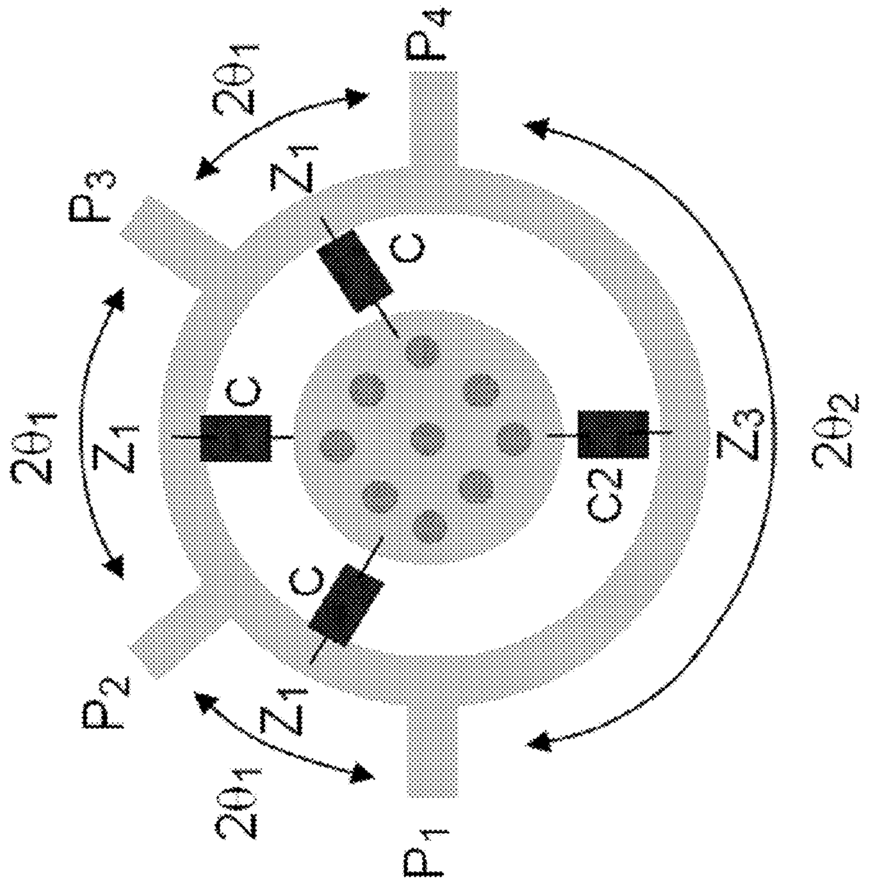
FIG. 3 is a block diagram of a balun in one embodiment of the invention.

In a third embodiment of the balun 10, the second embodiment is modified in that the 3λ/4 line section between the adjacent ports $P_1$, $P_4$ is replaced with its equivalent as a line loaded with a single capacitor this time, of capacitance C2, as shown in the block diagram of FIG. 3, this line section then consisting of two transmission line segments each of impedance $Z_3$ and of electrical length $\theta_2$, interspersed with a parallel capacitor of capacitance C2 that is also grounded.

This topology is more constrictive than the previous one explained in the second embodiment, because the impedance of the two segments replacing the 3λ/4 line is then, unlike before, proportional to their electrical length.

This is due to the fact that $$\theta_2 \in \left[\frac{\pi}{2}; \frac{3\pi}{4}\right] \mathrm{mod}(\pi),$$

and that the tan( ) function is negative and increasing over this interval. The "–" sign in equality 0_3 "transforms" the tan( ) function into an equivalent of the abs(tan) function over this interval. However, $\mathrm{abs}(\tan(\theta_2)\geq 1$ over $$\left[\frac{\pi}{2}; \frac{3\pi}{4}\right] \mathrm{mod}(\pi).$$

An additional reduction in the size of the balun 10 may be achieved if the value of $\theta_1$ is chosen to be less than 45° and if the value of 02 is chosen to be less than 135°, the impedance and electrical length values being determined using the following equalities 0_3 and 0_4.

This additional reduction is achieved notably if $3\theta_1>\theta_2$ and if working with a substrate and impedances that do not bring about an excessively large difference in line width between the impedances Z1 and Z3 (that is to say if working with a substrate that, depending on the impedances Z1 and Z3 that are used, does not bring about an increase in the width of the lines that would cause an overall increase in the surface area covered by the balun, despite the decrease in the length of the lines); one example of a standard criterion is that the length should be at least greater than 3 times the width.

$$Z_3 = -\frac{Z_{P1P4}}{\tan(\theta_2)} \quad \text{Equality 0\_3}$$

where $Z_{P1P4}$ is the impedance of the equivalent transmission line section between the adjacent ports $P_1P_4$, of physical length 3λ/4 and unloaded.

$$C2 = -\frac{2\tan(\theta_2)}{\omega Z_{P1P4}\tan(2\theta_2)} \quad \text{Equality 0\_4}$$

This means having to make compromises between the impedances of the various line segments of the balun: to reduce the size of the balun, it is necessary either to reduce the electrical length of its lines or to increase the impedance of its lines; however, in the case of the 3λ/4 line loaded with a single capacitor, these two parameters are proportional, and a compromise is necessary. It is also necessary to take into account the impedance of the λ/4 lines; if it is excessively different from that of the 3λ/4 line, the impedance discontinuity could reduce performance. The opposite is that, if they are too close, then this means that $\theta_1$ is close to 45° and therefore that the reduction of the λ/4 lines is less significant.

The values of capacitance C and impedance $Z_1$ for each segment of length $2\theta_1$ connecting the adjacent points $P_1$, $P_2$ to one another, respectively connecting the adjacent points $P_2$, $P_3$ to one another, and connecting the adjacent points $P_3$, $P_4$ to one another, are for their part still determined by applying equations 0_1 and 0_2 above.

The shape of a rat-race balun that is usually used is circular or square and is therefore not ideal notably for use in a push-pull processing module 10 on a printed circuit, which has a full-length structure.

Figure 4:
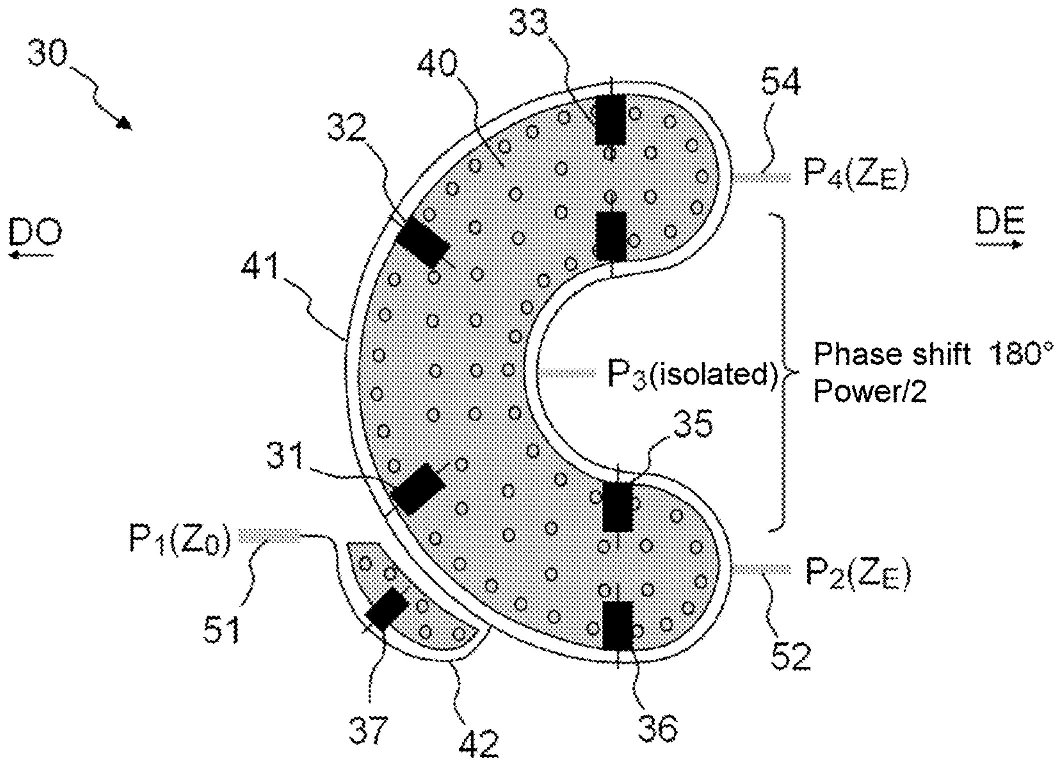
FIG. 4 illustrates a balun topology under consideration in one embodiment of the invention.
Figure 5:
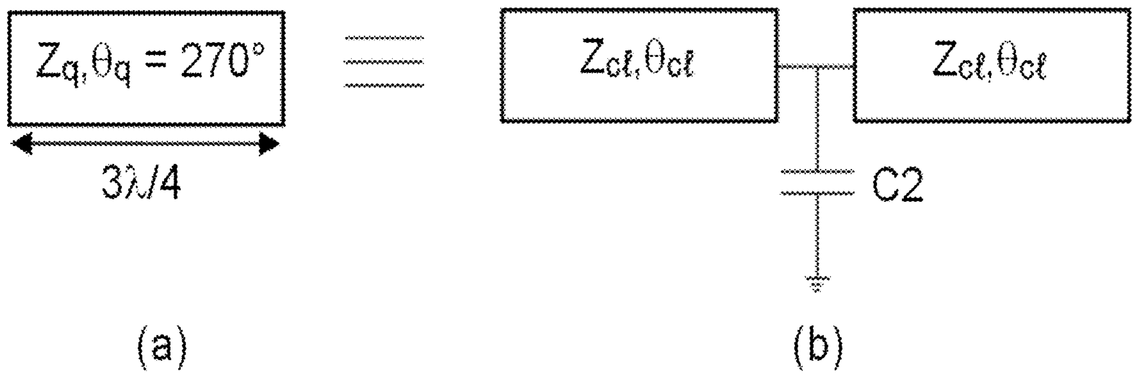
FIG. 5 shows a conventional 3λ/4 transmission line and an equivalent loaded 3λ/4 line.

In a fourth embodiment, it is therefore proposed to produce the balun 10 by giving it a "kidney" shape (in the plane in which the printed circuit extends), as shown in FIG. 4, instead of a ring shape as shown in FIGS. 2 and 3. This novel topology makes it possible to orient the two ports $P_2$, $P_4$ towards the HPA transistor 11, while still having an input port $P_1$ oriented in the opposite direction, via for example an impedance transformer.

In one embodiment, with reference to FIG. 4, the kidney-shaped balun 10 comprises a perimeter 41 consisting of transmission line sections. In the trigonometric sense, the section between the ports $P_2$ and $P_4$ is concave, and then the section between $P_4$ and $P_2$ is convex.

With reference to FIG. 4, each loaded line section capacitor is connected to the transmission line forming the perimeter 41, on the one hand, and grounded by way of one of the vias (represented by small circles in FIG. 4) in the zone 40 that is located inside the perimeter of the kidney-shaped balun 10, on the other hand.

In one embodiment, the kidney-shaped balun 10 is constructed using circular arcs between the 4 consecutive ports and the lengths of these arcs are set according to the lengths between ports defined by calculation according to one of the first, second and third embodiments. The combination of this kidney shape with the use of loaded lines as described in the second and third embodiments makes it possible to significantly reduce the size of the lines.

For example, if it is desired to implement the kidney shape in combination with the second embodiment with 6 capacitors, 31, 32, 33, 34, 35, 36, each of capacitance C: 12 circular arcs and their respective lengths are defined, with 2 concentric circular arcs (delimiting a transmission line) between each pair of consecutive ports: the structure is divided into 12 circular arcs; the angle of some of them is increased (those adjacent to the ports $P_2$, $P_3$ and $P_4$), without changing their length, so as to obtain the desired shape.

In one embodiment, the sections 52, 54 of the ports $P_2$ and $P_4$ immediately connected to the body of the kidney-shaped balun 10 (extending in the plane of the printed circuit) are parallel to one another and extend (in embodiments where their length is non-zero) in one and the same direction, DE, from the body of the kidney-shaped balun 10. In one embodiment, these two parallel sections are identical.

In one embodiment, a section 51 of the port $P_1$ (extending in the plane of the printed circuit) of the balun 10 is parallel to the sections of the ports $P_2$ and $P_4$ and extends in one direction from the balun 10 in an opposite direction, DO. In one embodiment, it is replaced with a resistor in parallel.

Thus, as described above and in a conventional manner, in this embodiment too, the input signal is supplied to the input of the kidney-shaped balun 10 at the port $P_1$; the signal transmitted in the balun 10 undergoes power division and phase opposition and the signals at the output of the ports $P_2$ and $P_4$ have a power equal to half the power of the input signal and are in phase opposition. The port $P_3$ of the balun 10 is isolated (grounded by a load) in the processing module shown in FIG. 1.

At the output of the balun 10, the impedance is for example 12.5Ω, and then matching circuits (length different from λ/4) are arranged between the HPA 11 and the balun 10 in order to reduce the impedance to $Z_E$ if necessary (an impedance transformer, as is known, comprises transmission lines having increasing or decreasing diameters to modify the impedance).

A balun 10 corresponding to embodiment 2 and/or 3 is particularly suitable for narrowband uses.

The embodiments described above may be implemented independently or in combination: for example, in one embodiment of the invention, the kidney-shaped balun 10 is combined with one of the first, second and third balun embodiments. Each of the embodiments makes it possible to have a balun with a reduced footprint.

In one embodiment, in order for the balun to be able to maintain an input impedance of 50Ω, with reference to FIG. 4, an impedance transformer 42, which, in one embodiment, is itself also loaded by a capacitor 37, is inserted between the perimeter 41 of the balun 10 and the port $P_1$ in order to further reduce the footprint of the processing module 1. Similarly to what has been explained in relation to the $2^{nd}$ embodiment and using the same equalities 0_1 and 0_2, a λ/4 transmission line portion of the impedance transformer is replaced with a line loaded by a capacitor, which is shorter than the unloaded equivalent.

The balun 10 according to the invention is therefore a signal distributor, with or without impedance transformation as the case may be, which is miniaturized and optimized with capacitor-loaded transmission lines. The invention advantageously replaces the historical solution combining a λ/4 impedance transformer associated with a λ/2 phase shifter. The invention is even more beneficial for substrates with low permittivity (FR-4 or RO4350b, low-cost substrates), where the footprint of the conventional solution is even more significant.

In terms of comparison with the solution, the footprint is greatly reduced: for a FR4 HP substrate with a dielectric permittivity constant of 4.34 and a height of 0.245 mm, a reduction of approximately 80% is observed, with reference to the table below, by combining embodiments 3 and 4 with a loaded transformer. This depends on the minimum width of a line and on the power accepted in the lines and in the capacitors.

TABLE 1

| | Historical solution | Current solution |
|---|---|---|
| Footprint | $\varepsilon_r$ = 4.34,<br>h = 0.245 mm<br>S = 40 * 40 = 1600 $mm^2$ | $\varepsilon_r$ = 4.34,<br>h = 0.245 mm<br>S = 16.5 * 19.6 = 323 $mm^2$<br>Reduction of almost 80% |
| Means | Microstrip lines | Microstrip lines and<br>5 to 7 capacitors |

where $\varepsilon_r$ is the dielectric permittivity associated with the FR4 HP substrate, h is the thickness of the substrate, and S is the surface area of the component.

Figure 8:
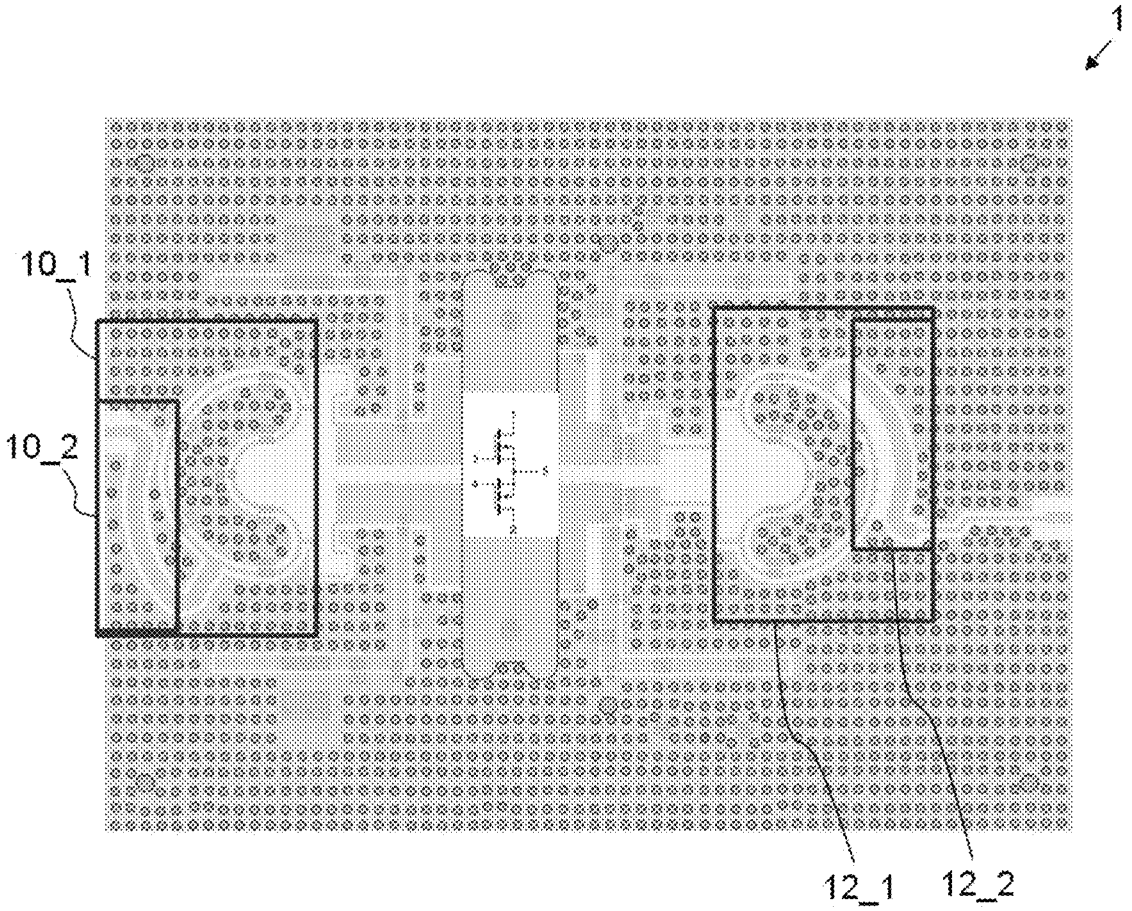
FIG. 8 shows a plan view of a printed circuit of a push-pull device of the type shown in FIG. 1 with a kidney-shaped balun.

FIG. 8 shows a plan view of a printed circuit of a push-pull device 1 in one embodiment of the invention. The balun 10, respectively 12, is kidney-shaped in line with the fourth embodiment (cf. frame 10_1, respectively 12_1). The frame 10_2, respectively 12_2, indicates where the impedance transformer is located (the load of the transformer is not visible in this figure).

Figure 7:
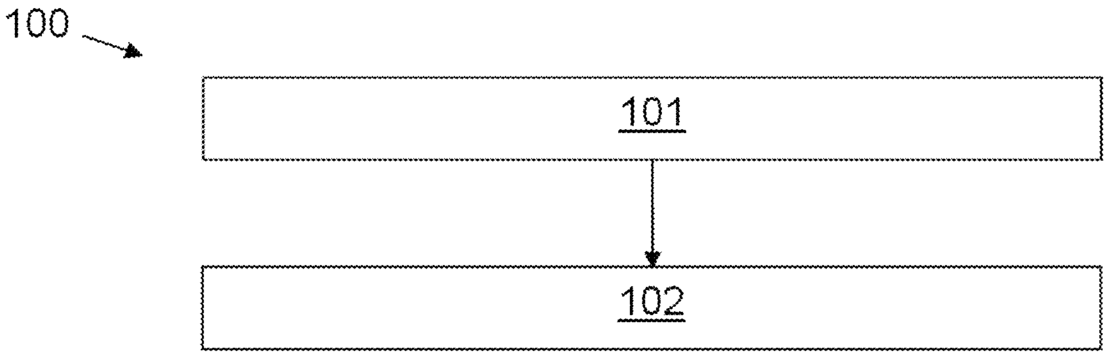
FIG. 7 shows a method for reducing the footprint of a balun in one embodiment of the invention.

With reference to FIG. 7, a method for reducing the footprint of a rat-race balun is now described.

In one embodiment, in a step 101 of designing such a rat-race balun, for example corresponding to the second embodiment, a footprint reduction module comprising a memory storing software instructions and a processor determines, following the execution of the software instructions on the processor, the values of $Z_1$, $\theta_1$ and C of the balun 10 satisfying equalities 0_1 and 0_2 such that $\theta_1<45°$.

For example, the substrate to be used is known, and the dimension of the lines as a function of impedance and dielectric length is therefore predictable. The operating impedance is known, and $\theta_1$ is chosen arbitrarily (complying with the condition $\theta_1<45°$), as a function of the obtained values of $Z_1$ and C. It is checked that the associated lines are technically feasible, and meet the requirements. Based on this check, it is decided to retain this value of $\theta_1$ or to amend it accordingly. The search is refined for each value of $\theta_1$.

In another embodiment, the footprint reduction module furthermore determines the values of $Z_3$, $\theta_2$ and C2 satisfying equalities 0_3 and 0_4 such that $\theta_2<135°$.

The balun is then manufactured taking these characteristics into account.

In a design step 102, with the electrical lengths of the line sections between ports of the balun being defined, the footprint reduction module determines, on the basis of these lengths and the actual impedances of the lines, the data defining a kidney shape for a rat-race balun and ports, so as to obtain a kidney-shaped balun as described above for example.

Steps 101, 102 may also be implemented independently of one another.

Such a method makes it possible to obtain a push-pull assembly comprising the rat-race balun constructed under these conditions, and occupying a reduced footprint.

The method may be implemented by executing software instructions on a processor as described. As an alternative, it may be implemented by dedicated hardware, typically a digital integrated circuit, either specific (ASIC) or based on programmable logic (for example FPGA/Field-Programmable Gate Array).

Justification for Obtaining Equalities 0_3 and 0_4:

FIG. 5 shows:

- on the left (section a): a conventional transmission line (that is to say not loaded by capacitors) of physical length 3λ/4 and of electrical length $\theta_q$=270° and
- on the right (section b): the equivalent capacitor-loaded transmission line, in the form of only two line sections, each of impedance $Z_{cl}$ and of electrical length $\theta_{cl}$, with a capacitor C in parallel, arranged between the two sections.

Matrix (1) below provides the parameters ABCD for the conventional transmission line of physical length 3λ/4:

$$\begin{bmatrix} A_q & B_q \\ C_q & D_q \end{bmatrix} = \begin{bmatrix} \cos(270) & jZ_q\sin(270) \\ jZ_q^{-1}\sin(270) & \cos(270) \end{bmatrix} = \begin{bmatrix} 0 & -jZ_q \\ -jZ_q^{-1} & 0 \end{bmatrix} \quad (1)$$

Next, to have an equivalent, it is necessary to have an equality between (1) and the matrix ABCD of a short-circuited shunt (2) multiplied on both sides by the matrix of a capacitor-loaded stub (3), represented by (4):

$$M_c = \begin{bmatrix} A_c & B_c \\ C_c & D_c \end{bmatrix} = \begin{bmatrix} 1 & 0 \\ j\omega C & 1 \end{bmatrix} \quad (2)$$

$$M_{cl} = \begin{bmatrix} A_{cl} & B_{cl} \\ C_{cl} & D_{cl} \end{bmatrix} = \begin{bmatrix} \cos(\theta_{cl}) & jZ_{cl}\sin(\theta_{cl}) \\ jZ_{cl}^{-1}\sin(\theta_{cl}) & \cos(\theta_{cl}) \end{bmatrix} \quad (3)$$

-continued $$M_q = M_{cl}M_cM_{cl} \quad (4)$$

Equality (4) makes it possible to establish the following equations:

$$A_q = \cos(\theta_{cl})^2 - \omega CZ_{cl}\sin(\theta_{cl})\cos(\theta_{cl}) + jZ_{cl}^{-1}\sin(\theta_{cl}) \quad \#(5.a)$$

$$B_q = jZ_{cl}\sin(\theta_{cl})\cos(\theta_{cl}) - j\omega CZ_{cl}^2\sin(\theta_{cl})^2 + \cos(\theta_{cl})^2 \quad \#(5.b)$$

The correspondence between (1) and (5.a), (6) is used to determine:

$$\omega C = \frac{2}{Z_{cl}\tan(2\theta_{cl})} \quad (6)$$

Then substituting (6) into (5.b) gives rise to (7)

$$Z_{cl} = -\frac{Z_q}{\tan(\theta_{cl})} \quad (7)$$

Finally, using (6) and (7), the value of the capacitance used in the equivalent loaded line is equal to $$C = -\frac{2\tan(\theta_{cl})}{\omega Z_q\tan(2\theta_{cl})} \quad (8)$$

Since C>0, it follows that:

$$\tan(\theta_{cl}) < 0 \text{ and } \tan(2\theta_{cl}) > 0 \text{ or} \quad (9.a)$$

$$\tan(\theta_{cl}) > 0 \text{ and } \tan(2\theta_{cl}) < 0 \quad (9.b)$$

Using conditions (9.a) and (9.b), and taking into account that $Z_{cl}>0$, the only possible values for $\theta_{cl}$ are:

$$\theta_{cl} \in \left]\frac{\pi}{2}; \frac{3\pi}{4}\right]\text{mod}(\pi) \quad (10)$$

Figure 6:
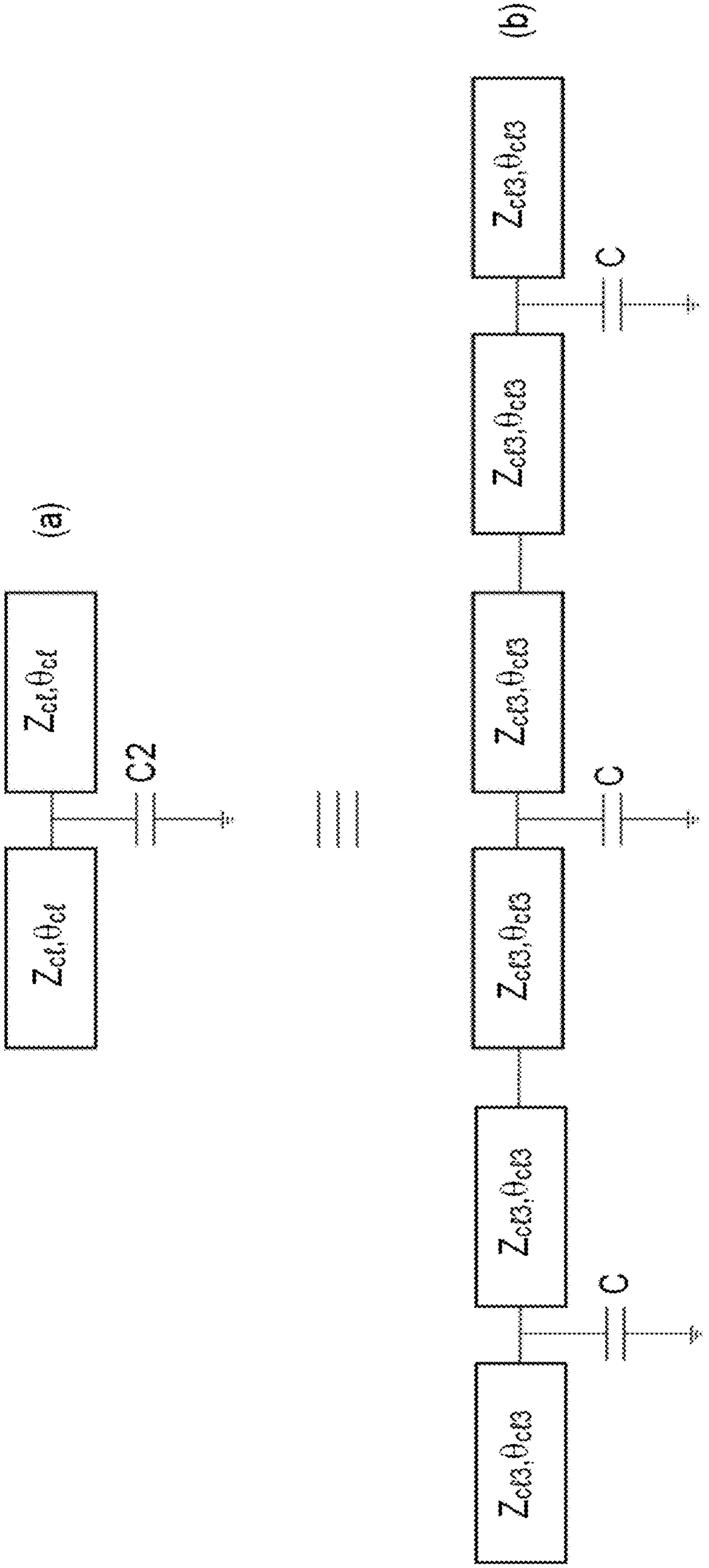
FIG. 6 shows a loaded 3λ/4 line and three equivalent loaded λ/4 lines.

The aim is to reduce the length of the 3λ/4 transmission line by replacing the three loaded λ/4 lines with a loaded 3λ/4 line as shown in FIG. 6: it is necessary to find the condition for:

$$\frac{3\pi}{2} > 6\theta_{cl3} > 2\theta_{cl} \quad (11)$$

To satisfy (11), it is necessary to take into account condition (10). Finally, the loaded 3λ/4 line may have a size reduction for:

$$\theta_{cl} \in \left]\frac{\pi}{2}; \frac{3\pi}{4}\right[\text{mod}(\pi) \quad (12)$$

An ADS simulation was used to demonstrate that the miniaturized rat-race couplers have the same performance for three capacitor-loaded λ/4 lines and for one capacitor-loaded 3λ/4 line.

Beyond the miniaturization aspects, these novel aspects provide greater flexibility with regard to the impedance value.

The invention claimed is:

1. A rat-race balun, comprising:
a transmission line loop;
4 input-output ports $P_1$, $P_2$, $P_3$, $P_4$ connected to said transmission line loop, said rat-race balun being designed to receive a first signal on the port $P_1$, and to divide said first signal into a second signal that is delivered to the port $P_2$ and a third signal that is delivered to the port $P_4$, said second signal and said third signal being in phase opposition with one another; and
an impedance transformer loaded by a capacitor between the port $P_1$ and the transmission line loop, wherein:
the rat-race balun is kidney-shaped and
the ports $P_2$, $P_4$ each comprise at least a first section connected to the transmission line, the first section of the port $P_2$ being parallel to the first section of the port $P_4$.

2. The rat-race balun according to claim 1, wherein the mutually parallel first section of the port $P_2$ and first section of the port $P_4$ face one another.

3. The rat-race balun according to claim 1, wherein the ports adjacent to one another from among the ports $P_1$, $P_2$, $P_3$, $P_4$ are connected by respective sections of the transmission line loop, and at least one of said sections are capacitor-loaded transmission line sections.

4. The rat-race balun according to claim 3, wherein:
each of the respective transmission line sections between $P_1$ and $P_2$, between $P_2$ and $P_3$, between $P_3$ and $P_4$ is a line section of electrical length $2\theta_1$, of impedance $Z_1$ and loaded by a capacitor of capacitance C and; where $\theta_1<45°$ and the following equalities are satisfied:

$$C=\frac{2\tan(\theta_1)}{\omega Z_c\tan(2\theta_1)} \text{ and } Z_l=\frac{Z_c}{\tan(\theta_1)}$$

w being equal to 2πf, with f being an operating frequency, and
$Z_c$ being the impedance of the unloaded transmission line section of physical length λ/4 equivalent to said loaded line section, λ being the wavelength corresponding to a center frequency of the first signal.

5. The rat-race balun according to claim 3, wherein:
the respective transmission line section between the adjacent ports $P_1$ and $P_4$ is of electrical length $6\theta_1$ comprising three consecutive line subsections each of electrical length $2\theta_1$, of impedance $Z_1$ and loaded by a capacitor of capacitance C; where $\theta_1<45°$ and the following equalities are satisfied:

$$C=\frac{2\tan(\theta_1)}{\omega Z_c\tan(2\theta_1)} \text{ and } Z_l=\frac{Z_c}{\tan(\theta_1)}$$

w being equal to 2πf, with f being an operating frequency, and
$Z_c$ being the impedance of the unloaded transmission line subsection of physical length λ/4 equivalent to said loaded line subsection, λ being the wavelength corresponding to a center frequency of the first signal.

6. The rat-race balun according to claim 3, wherein:
the respective transmission line section between the adjacent ports $P_1$ and $P_4$ is of electrical length $2\theta_2$, of impedance $Z_3$ and is a line section loaded by a capacitor of capacitance C2; where $\theta_2<135$ and the following equalities are satisfied:

$$C2=-\frac{2\tan(\theta_2)}{\omega Z_{P1P4}\tan(2\theta_2)} \text{ and } Z_3=-\frac{Z_{P1P4}}{\tan(\theta_2)}$$

w being equal to 2πf, with f being an operating frequency, and
$Z_{PIP4}$ being the impedance of the unloaded transmission line section of physical length 3λ/4 equivalent to said loaded line section, λ being the wavelength corresponding to a center frequency of the first signal.

7. A method for reducing the footprint of a rat-race balun comprising a transmission line loop, 4 input-output ports $P_1$, $P_2$, $P_3$, $P_4$ connected to said transmission line loop, and an impedance transformer loaded by a capacitor between the port $P_1$ and the transmission line loop, said rat-race balun being designed to receive a first signal on the port $P_1$, and to divide said first signal into a second signal that is delivered to the port $P_2$ and a third signal that is delivered to the port $P_4$, said second signal and said third signal being in phase opposition with one another, comprising the following steps implemented by an electronic device for determining rat-race balun characteristics:
determination of a kidney shape for the rat-race balun;
connection of a first section of each of the ports $P_2$, $P_4$ to the transmission line, the first section of the port $P_2$ being parallel to the first section of the port $P_4$.

8. The method for reducing the footprint of a rat-race balun according to claim 7, according to which the mutually parallel first section of the port $P_2$ and first section of the port $P_4$ face one another.

9. The method for reducing the footprint of a rat-race balun according to claim 7, according to which the ports adjacent to one another from among the ports $P_1$, $P_2$, $P_3$, $P_4$ are connected by respective sections of the transmission line loop, and at least one of said sections are capacitor-loaded transmission line sections.

* * * * *